(12) United States Patent
Heider et al.

(10) Patent No.: US 7,685,162 B2
(45) Date of Patent: Mar. 23, 2010

(54) METHOD AND DEVICE FOR ADJUSTING USER-DEPENDENT PARAMETER VALUES

(75) Inventors: Andreas Heider, Munich (DE); Ottmar Sirch, Ebersberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 409 days.

(21) Appl. No.: 11/410,142

(22) Filed: Apr. 25, 2006

(65) Prior Publication Data

US 2006/0195483 A1 Aug. 31, 2006

Related U.S. Application Data

(63) Continuation of application No. PCT/EP2004/011141, filed on Oct. 6, 2004.

(30) Foreign Application Priority Data

Oct. 30, 2003 (DE) ................ 103 50 715

(51) Int. Cl.
*G06F 17/30* (2006.01)
*G06F 17/00* (2006.01)

(52) U.S. Cl. ............ 707/104.1; 701/35; 701/36; 701/49

(58) Field of Classification Search ........... 701/35–36, 701/49
See application file for complete search history.

(56) References Cited

U.S. PATENT DOCUMENTS 6,122,580 A * 9/2000 Autermann ............... 701/49
6,131,060 A * 10/2000 Obradovich et al. ......... 701/49
6,198,996 B1 * 3/2001 Berstis .................... 701/36
6,304,817 B1 * 10/2001 Troedel .................. 701/200
6,438,465 B2 * 8/2002 Obradovich et al. ........ 701/1

(Continued)

FOREIGN PATENT DOCUMENTS

DE 196 01 816 A1 7/1997

(Continued)

OTHER PUBLICATIONS

International Search Report for PCT/EP2004/011141 dated Dec. 30, 2004.

(Continued)

*Primary Examiner*—James Trujillo
*Assistant Examiner*—Dawaune Conyers
(74) *Attorney, Agent, or Firm*—Crowell & Moring LLP

(57) ABSTRACT

A method and device for adjusting user-dependent parameter values in or on at least one automotive device in a motor vehicle and for saving the settings in at least one data memory inside the vehicle and/or outside the vehicle are provided. To improve the convenience of the known method with one or more main users and one more temporary users, there is a query in a first step to ascertain whether the user-dependent parameter values currently set are to be saved as temporary parameter values or as quasi-permanent parameter values in the at least one data memory inside the vehicle and/or outside the vehicle. In a second step, the user-dependent parameter values currently set are saved in accordance with the response to the inquiry, and in a third step, regardless of the result of the inquiry, the quasi-permanent parameter values are always set.

19 Claims, 2 Drawing Sheets

U.S. PATENT DOCUMENTS

| | | | |
|---|---|---|---|
| 6,775,603 B2 * | 8/2004 | Yester et al. | 701/36 |
| 2003/0004897 A1 * | 1/2003 | Smith, IV | 705/76 |
| 2003/0078709 A1 | 4/2003 | Yester et al. | |

FOREIGN PATENT DOCUMENTS

| | | |
|---|---|---|
| DE | 198 40 955 A1 | 3/2000 |
| DE | 199 43 484 A1 | 3/2001 |
| DE | 199 61 619 A1 | 6/2001 |
| DE | 100 12 756 A1 | 9/2001 |
| DE | 100 34 380 A1 | 2/2002 |
| DE | 100 42 055 A1 | 3/2002 |
| DE | 100 64 937 A1 | 7/2002 |
| EP | 1 211 141 A2 | 6/2002 |

OTHER PUBLICATIONS

German Search Report for 103 50 715.9 dated Dec. 21, 2004.

* cited by examiner

METHOD AND DEVICE FOR ADJUSTING USER-DEPENDENT PARAMETER VALUES

CROSS REFERENCE TO RELATED APPLICATIONS

This application is a continuation of International Patent Application No. PCT/EP2004/011141 filed Oct. 6, 2004, and claims priority under 35 U.S.C. § 119 to German Patent Application No. 103 50 715.9 filed Oct. 30, 2003. The entire disclosure of the aforementioned documents is herein expressly incorporated by reference.

BACKGROUND AND SUMMARY OF THE INVENTION

The present invention relates to a method and a device for adjusting user-dependent parameter values of a motor vehicle on at least one automotive device for saving settings in at least one data memory inside or outside the motor vehicle.

German Patent DE 100 42 055 C2 describes a personalizing device for user-dependent adjustment of parameter values of at least one controller of a motor vehicle. The personalizing device has a recognition element by which at least one biometric feature of the user is detected and by which at least one corresponding user-based code of a comparator unit is transmitted, so that the user-based code can be compared to codes stored in the comparator unit. If the codes match, the assigned parameter values of the at least one controller of the motor vehicle are adjusted. If the user alters the parameter values assigned to him on the basis of his biometric feature, this change is detected, and the current parameter values are stored and assigned to the user-dependent code.

Such a device and/or a corresponding method require a relatively expensive biometric recognition, but nevertheless a vehicle key and a respective locking system can be omitted, if the vehicle is to be made available to a user previously not recognized by the vehicle.

An object of the present invention is to provide a method for adjusting user-dependent parameter values of a motor vehicle that is convenient for one or more main users or one or more temporary users.

Other objects advantages, and novel features of the present invention will become apparent from the following detailed description of the invention when considered with the accompanying drawings.

DETAILED DESCRIPTION OF THE DRAWINGS

According to the present invention, user-dependent parameter values which are adjusted on or in at least one automotive device are understood to include user-dependent adjustment values such as the adjustment values for the seat position, the steering wheel position and the mirror position. The user-dependent parameter values may further include the adjustment of, and/or providing, user-dependent data such as a telephone and/or address directory or a directory of navigation destinations for use by a navigation system and/or software adjustments already made by the user. User-dependent adjustment of parameter values according to the present invention should thus also be understood to refer to any personalization of the hardware and/or automotive devices and/or software of a vehicle by the respective current user of the vehicle.

As an alternative or in addition, the adjustment of user-dependent parameter values, i.e., making these values available should be understood to refer to providing personal and/or vehicle-specific services, usually software assisted, e.g., "BMW Assist," which is a vehicle-specific service in the form of an online service made available to each user of the vehicle. If only the current user of the vehicle—in contrast with other users—is authorized to use the respective service in the case of a person-specific service, then the service may be made available to the current user in the manner or to the extent personalized by or for that user and/or in a personalized form.

Figure 1:
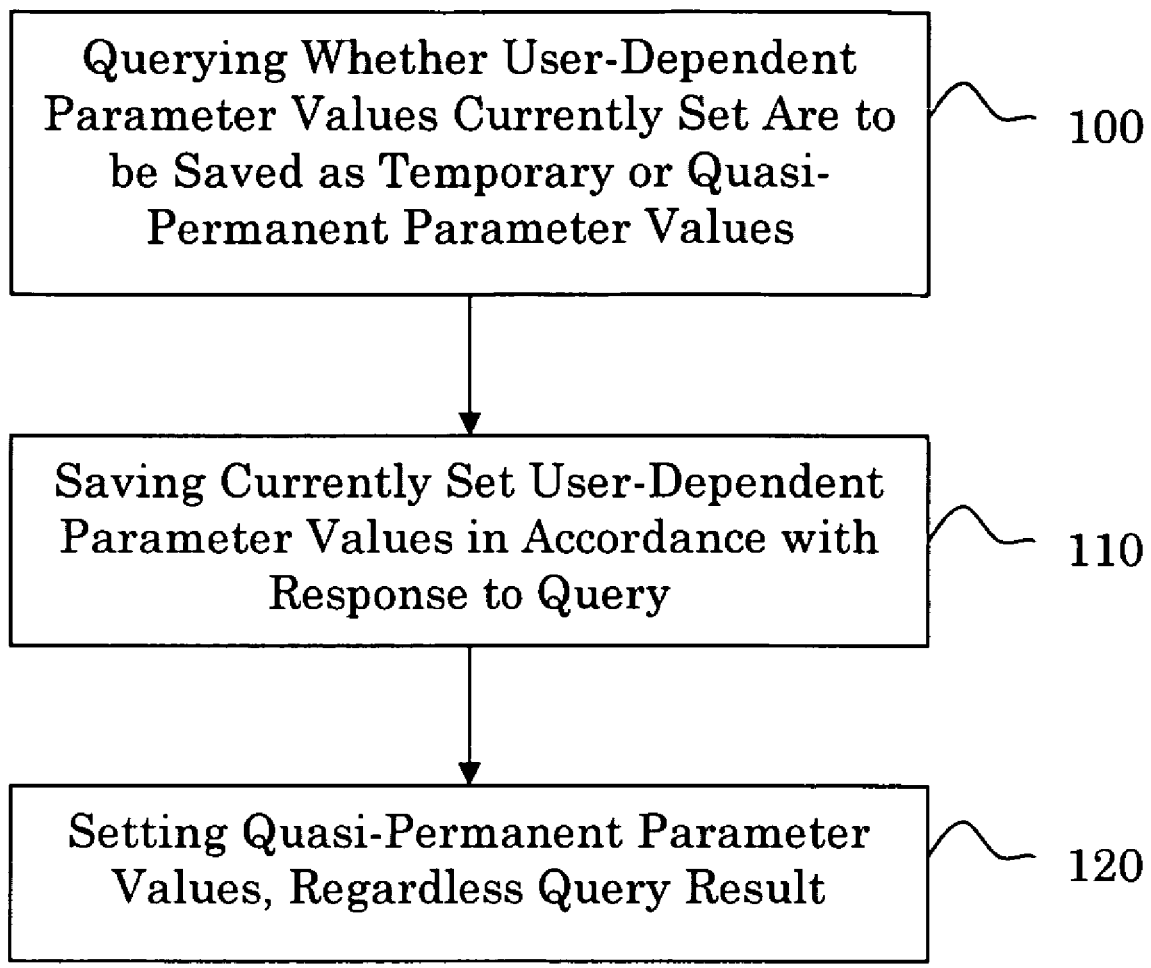
FIG. 1 illustrates an exemplary embodiment of a method for adjusting user-dependent parameter values of a vehicle, in accordance with the present invention.

FIG. 1 illustrates an exemplary embodiment of a method for adjusting user-dependent parameter values of a vehicle, in accordance with the present invention. According to the exemplary embodiment of the method, in a first step there is a query to determine whether the user-dependent parameter values currently set are to be saved as temporary or quasi-permanent parameter values in at least one data memory inside or outside the vehicle (step 100). The method illustrated in FIG. 1 also includes the step 110 of saving the currently set user-dependent parameter values, in accordance with the response to the query in step 100 and a step 120 of setting quasi-permanent parameter values, regardless of the query result. These steps are further described below.

The query is directed at the current user of the vehicle and may be made acoustically, e.g., by voice output, or visually via a display. To answer the query, a manual input device and/or a voice input device (voice recognition) may be made available to the user.

FIG. 1 illustrates a step 110 of saving the currently set user-dependent parameter values, in accordance with the response to the query in step 100. If the current user is a temporary user of the vehicle, he will not usually want to change the quasi-permanent parameter values reserved for the main user of the vehicle. Instead, such a user will answer the query by stating that he wishes to save his parameter values as temporary parameters values if he would like to use the vehicle again in the foreseeable future or if he wants to have these parameter values available for a future use of a vehicle of the same or similar type, e.g., for frequent use of different leased or loaned vehicles.

In the latter case, the present invention proposes optional transfer of the parameter values to a data memory outside the vehicle, the contents of which can be transmitted to another vehicle on request by the user, whereupon the parameter values are also made available in that vehicle and the automotive devices are adjusted accordingly. According to the present invention, the parameter values of the main user of the vehicle may also be transferred to a data memory, so that he can conveniently transfer the parameter values of his own vehicle to a lease vehicle or even to a new vehicle.

Overriding and/or expansion of quasi-permanent parameter values may be performed after a positive outcome of an authorization check. The main user is able to ensure in this way that a temporary user cannot delete or alter the parameter values, i.e., personalized settings made by him—possibly in a very time-consuming procedure.

FIG. 1 illustrates a step 120 of setting quasi-permanent parameter values, regardless of the query result. In other words, regardless of the results of the query, according to this invention, the most current and/or highest priority quasi-permanent parameter values may always be used for the settings, which may take place in the period of time between the vehicle being out of operation and its return to operation. The most current and/or highest priority main user will thus conveniently always find his vehicle with his personal parameter values when starting operation of the vehicle, even if he has made his vehicle available to a temporary user or another main user in the meantime and these changes have been made in the settings of the automotive devices. The temporary user can access the temporary parameter values saved by him and another main user can access the quasi-permanent parameter values assigned to him and can thus restore the state set by him.

The present invention is explained in greater detail below on the basis of exemplary embodiments.

Example 1 describes the use of the inventive method by one or more main users of a vehicle.

Example 2 describes the use of the inventive method by one or more temporary users of the vehicle.

If a main user of a vehicle, in particular its owner, has lent his vehicle to a temporary user, then his vehicle will usually be in a condition in which the seats, mirror settings, the radio stations and the electric telephone book of the vehicle, etc. have been altered, i.e., adjusted by the temporary user. Therefore, before starting his trip, the main user must spend a considerable amount of time to restore his settings on the automotive devices.

If the vehicle is then used again by the temporary user, the latter must again make his adjustments and then the inconvenience for the main user begins again.

Figure 2:
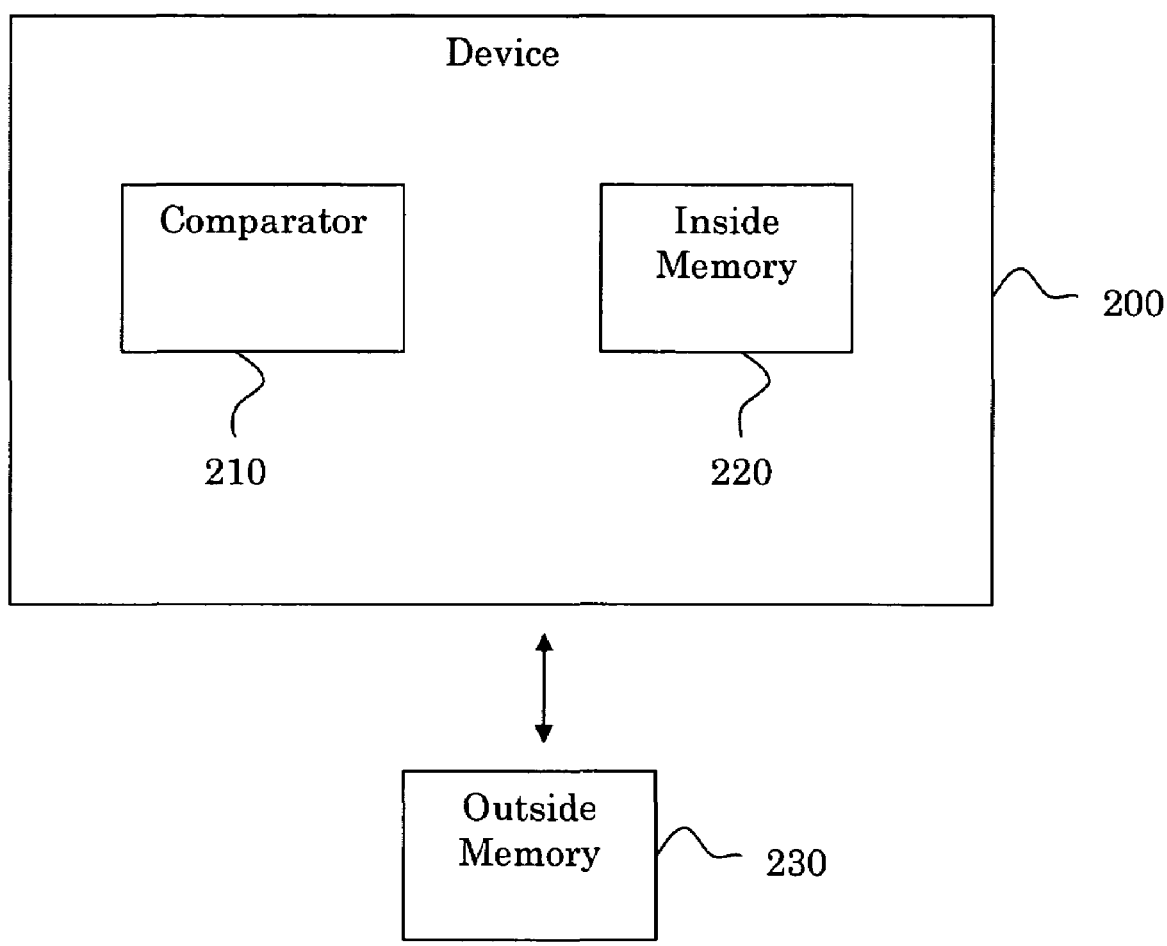
FIG. 2 illustrates an exemplary embodiment of a device for adjusting user-dependent parameter values of a vehicle, in accordance with the present invention.

FIG. 2 illustrates an exemplary embodiment of a device for adjusting user-dependent parameter values of a vehicle, in accordance with the present invention. The device 200 illustrated in FIG. 2 includes a comparator 210 and an inside memory 220, which are internal to a motor vehicle. The memory may further, or alternatively, include an outside memory 230, which is external to the motor vehicle. The device is further described below.

According to this invention, at the latest, at the time of stopping the vehicle, a comparator device checks on whether any changes have been made in the settings of the adjustable automotive devices in conjunction with the current trip of the vehicle. If changes have been made in the settings, there is an acoustic or visual query to determine whether the current settings and/or their parameters values are to be stored as temporary or quasi-permanent parameter values.

If the user wishes to save the parameter values as quasi-permanent parameter values, which is an option provided for one or more main users, then an authorization check is performed, e.g., by input of a PIN (personal identification number) or by acquisition of a biometric feature of the user, e.g., by voice recognition. With a positive outcome of the test, the parameter values are saved as quasi-permanent parameter values in at least one data memory provided in the vehicle and optionally in at least one memory outside the vehicle. If there is more than one main user, their quasi-permanent parameter values are saved accordingly, using their names or the like.

In the case of a portable memory outside the vehicle, it may be, for example, a memory in the vehicle key belonging to the main user and/or a memory in a cell phone, a SIM (Subscriber Identity Module) card, a PDA (Personal Digital Assistant), a chip card or a notebook belonging to the main user. According to the present invention, the parameter values saved in the external data memory can be imported into another vehicle, e.g., via the Bluetooth standard or some other suitable form of transmission and can be used there for personal-specific and/or user-dependent settings on the automotive devices in this vehicle.

According to present invention, independently of the result of the query, the quasi-permanent parameter values are always set after temporary or quasi-permanent saving of the data after stopping the vehicle. Therefore, the main user of the vehicle is preferred and will find his vehicle with his set values, even after his vehicle has been loaned to a temporary user, and he can start operation of the vehicle directly. If there are several main users having different priorities, then regardless of the result of the query, the parameter values of the main user having the highest priority are always set after turning off the vehicle. If the main users all have the same priority, then after stopping the vehicle, the most current parameter values of the main user who was the last to use the vehicle are set on the automotive devices.

The second exemplary embodiment described below explains the use of the inventive method by one or more temporary users of a vehicle. When a temporary user enters the vehicle of a main user that the main user has allowed him to use, he will find a vehicle whose adjustable automotive devices are adjusted in accordance with the parameter values of the main user. The temporary user will adjust the automotive devices according to his needs. In particular, after stopping the engine, the temporary user will be asked visually or acoustically whether he wants to save the parameter settings in a data memory inside the vehicle and/or to transmit them to a portable data carrier brought along by the temporary user and stored there; such a portable data carrier may be a cell phone, a PDA or chip card, for example. Without an authorization check, the parameter values of the temporary user are saved and/or transmitted as temporary parameters values, e.g., using the Bluetooth standard. Despite the inventive query, saving of the parameters as quasi-permanent parameter values provided for one or more main users is not usually done because this is performed according to the present invention only after an authorization check which will usually be "passed" only by the main user, as has already been described.

When the temporary user leaves the vehicle and then reenters it after a period of time, he will again encounter the settings of the main user. To eliminate the need for a temporary user to readjust the settings, according to the present invention, after a temporary user has entered the vehicle after having used it previously, there is a visual and/or acoustic query as to whether he wants to use parameter values that have already been saved as temporary parameter values on the basis of a previous use of the vehicle by the same temporary user or which have been saved as quasi-permanent parameter values for one or more main users. If the temporary user selects a set of saved parameter values in a suitable manner, e.g., by voice input and/or by voice recognition with allocation of the parameter values saved for the voice thus recognized, then these parameter values are used for adjusting the automotive devices. Before this is done, an authorization check for temporary parameter values and/or for quasi-permanent parameter values may optionally be performed. This seems appropriate in particular when the "settings," i.e., parameter values, include a personal telephone book for use with a telephone provided in the vehicle or some other information which tends to be more personal, i.e., confidential.

As an alternative or in addition, it is possible to inquire whether entrained parameter values are to be transmitted to the vehicle and saved and/or used there as temporary and/or quasi-permanent parameter values. If parameter values already saved, in particular those of a main user, must be overwritten for lack of memory capacity, this may be performed after an authorization check. For example, if the parameter values are supplied in a Bluetooth cell phone or some other cell phone, this cell phone may easily be connected to the hands-free device and/or a telephone book and dialing device provided in a vehicle and then the telephone book of the cell phone can be accessed. Likewise, settings, i.e., parameter values entered by the temporary user or main user, can also be transmitted to the data memory outside the vehicle for subsequent renewed use or for use in another vehicle and saved there. This transmission may take place by using Bluetooth or some other communications standard.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for adjusting user-dependent parameter values on or in at least one automotive device of a motor vehicle and for saving the settings in at least one data memory inside the vehicle or outside the vehicle, comprising the acts of:
   querying whether the user-dependent parameter values currently set are to be saved as temporary parameter values associated with a temporary user of the vehicle or quasi-permanent parameter values associated with a main user of the vehicle in the at least one data memory inside the vehicle or outside the vehicle,
   saving the currently set user-dependent parameter values in accordance with a response to the query, wherein, when the response indicates that the user-dependent parameter values currently set are to be saved as temporary parameter values associated with the temporary user, the user-dependent parameter values are saved as temporary parameter values associated with the temporary user, and when the response indicates that the user-dependent parameter values currently set are to be saved as quasi-permanent parameter values associated with the main user, the user-dependent parameter values are saved as quasi-permanent parameter values associated with the main user, and
   setting, when the motor vehicle is turned off, the user-dependent parameter values on or in the at least one automotive device as quasi-permanent parameter values associated with a primary main user of the vehicle having a highest priority of all users, regardless of the result of the query.

2. The method as claimed in claim 1, wherein the user-dependent parameter values that are set in or on at least one automotive device are user-dependent settings comprising settings for at least one of a seat position, a steering wheel position, a mirror position, user-dependent data comprising a telephone directory or an address directory or a directory of navigation destinations for use by a navigation system, or software settings already performed by a user.

3. The method as claimed in claim 1, wherein the most current quasi-permanent parameter values or the highest priority quasi-permanent parameter values are set on the at least one automotive device after the user leaves the motor vehicle or in the period of time after locking the motor vehicle and before a subsequent opening of the motor vehicle.

4. The method as claimed in claim 1, wherein the user-dependent parameter values currently set are saved as the most current quasi-permanent parameter values or the highest priority quasi-permanent parameter values only after a positive outcome of an authorization check by voice recognition, whereby the user-dependent parameter values currently set are saved in addition to other quasi-permanent parameter values or the user-dependent parameter values currently set replace other quasi-permanent parameter values.

5. The method as claimed in claim 4, wherein the user-dependent parameter values currently set are saved in a data memory included in a vehicle key, said data memory being currently in use for operation of the vehicle or provided externally to the vehicle.

6. The method as claimed in claim 1, wherein the user-dependent parameter values currently set are saved as temporary parameter values in the data memory inside the motor vehicle, assigning a name or another individualized item of information to the user-dependent parameter values currently set, and after opening the motor vehicle, there is a query to determine whether automotive devices are to be adjusted in accordance with the saved temporary parameter values.

7. The method as claimed in claim 1, wherein the temporary parameters values are saved in a shift register memory, a set of more recent temporary parameter values replacing a set of older temporary parameter values.

8. The method as claimed in claim 1, wherein a comparison is made of quasi-permanent parameter values saved in the data memory outside the motor vehicle with the user-dependent parameter values currently set in the motor vehicle, whereby, when there is a deviation, the quasi-permanent parameter values saved in the data memory outside the motor vehicle are adjusted in the motor vehicle.

9. The method as claimed in claim 1, wherein the user-dependent parameter values currently set are saved as the temporary or quasi-permanent parameter values in the at least one data memory outside the vehicle, which is provided in a cell phone, Subscriber Identity Module card, a personal digital assistant, a chip card or a notebook, and transmission of the user-dependent parameter values currently set from the motor vehicle to the data memory outside the motor vehicle is performed as a wireless transmission.

10. The method as claimed in claim 9, wherein the user-dependent parameter values are transmitted from the at least one data memory outside the motor vehicle by wireless transmission to another vehicle for adjusting its automotive devices, after a first authorization check by an authorization checking device in the other vehicle has turned out positive.

11. The method as claimed in claim 10, wherein the user-dependent parameter values are saved as temporary parameter values if the outcome of the first authorization check is positive, and if the outcome of a second authorization check is positive, the user-dependent parameter values are saved as quasi-permanent parameter values in the other vehicle.

12. The method as claimed in claim 2, wherein the most current quasi-permanent parameter values or the highest priority quasi-permanent parameter values are set on the at least one automotive device after the user leaves the motor vehicle or in the period of time after locking the motor vehicle and before a subsequent opening of the motor vehicle.

13. The method as claimed in claim 2, wherein the user-dependent parameter values currently set are saved as the most current quasi-permanent parameter values or the highest priority quasi-permanent parameter values only after a positive outcome of an authorization check by voice recognition, whereby the user-dependent parameter values currently set are saved in addition to other quasi-permanent parameter values or the user-dependent parameter values currently set replace other quasi-permanent parameter values.

14. The method as claimed in claim 13, wherein the user-dependent parameter values currently set are saved in a data memory included in a vehicle key, said data memory being currently in use for operation of the vehicle or provided externally to the vehicle.

15. The method as claimed in claim 2, wherein the user-dependent parameter values currently set are saved as temporary parameter values in the data memory inside the motor vehicle, assigning a name or another individualized item of information to the user-dependent parameter values currently set, and after opening the motor vehicle, there is a query to determine whether automotive devices are to be adjusted in accordance with the saved temporary parameter values.

16. The method as claimed in claim 2, wherein the temporary parameters values are saved in a shift register memory, a set of more recent temporary parameter values replacing a set of older temporary parameter values.

17. The method as claimed in claim 2, wherein a comparison is made of quasi-permanent parameter values saved in the data memory outside the motor vehicle with the user-dependent parameter values currently set in the motor vehicle, whereby, when there is a deviation, the quasi-permanent parameter values saved in the data memory outside the motor vehicle are adjusted in the motor vehicle.

18. The method as claimed in claim 2, wherein the user-dependent parameter values currently set are saved as the temporary or quasi-permanent parameter values in the at least one data memory outside the vehicle, which is provided in a cell phone, Subscriber Identity Module card, a personal digital assistant, a chip card or a notebook, and transmission of the user-dependent parameter values currently set from the motor vehicle to the data memory outside the motor vehicle is performed as a wireless transmission.

19. The method as claimed in claim 18, wherein the user-dependent parameter values are transmitted from the at least one data memory outside the motor vehicle by wireless transmission to another vehicle for adjusting its automotive devices, after a first authorization check by an authorization checking device in the other vehicle has turned out positive.

* * * * *